United States Patent [19]

Ohe

[11] Patent Number: 5,244,261
[45] Date of Patent: Sep. 14, 1993

[54] ANTISKID MODULATOR WITH FLOW REGULATING AND PASSAGE SELECTING VALVES

[75] Inventor: Takeshi Ohe, Higashimatsuyama, Japan

[73] Assignee: Jidosha Kiki Co., Ltd., Tokyo, Japan

[21] Appl. No.: 752,105

[22] Filed: Aug. 29, 1991

[30] Foreign Application Priority Data

Sep. 4, 1990 [JP] Japan .................. 2-234134

[51] Int. Cl.⁵ .............................................. B60T 8/34
[52] U.S. Cl. ................... 303/115.2; 303/115.4; 303/84.1
[58] Field of Search ......... 303/84.1, DIG. 3, DIG. 4, 303/119.2, 116.1, 115.2, 115.4, 117.1

[56] References Cited

U.S. PATENT DOCUMENTS

| | | | |
|---|---|---|---|
| 4,659,151 | 4/1987 | Schopper | 303/84.1 X |
| 4,690,464 | 9/1987 | Matsuda et al. | 303/115 PP |
| 4,790,351 | 12/1988 | Kervagoret | 303/119 SV X |
| 4,964,681 | 10/1990 | Burgdorf et al. | 303/DIG. 4 X |
| 5,046,788 | 9/1991 | Lindenman | 303/84.1 X |

FOREIGN PATENT DOCUMENTS 3904132  8/1990  Fed. Rep. of Germany ... 303/116 R

Primary Examiner—Robert J. Oberleitner
Assistant Examiner—Josie A. Ballato
Attorney, Agent, or Firm—Varndell Legal Group

[57] ABSTRACT

A flow regulating valve having an opening valve, which opens or closes a first passage 5m, 25, 5k, 5j and 5h and this opening valve is provided with a second passage 8 and includes a housing 5a accommodating an orifice 9 and a cylindrical member 24 concentrically engaged on this housing 5a. By relative movement of the housing 5a and the cylindrical member 24, the first passage is opened or closed. Further, in normal case, the flow regulating valve 6 opens the opening valve and communicates the master cylinder 1 with the passage selector valve 5 through the first passage. When the pressure difference on both ends of the cylindrical member 24 exceeds the preset value, the cylindrical member 24 is slid and the opening valve closes the first passage, and the discharge side of the pump 12 is communicated with the passage selector valve 5 only through the second passage 8.

8 Claims, 6 Drawing Sheets

PRIOR ART

ANTISKID MODULATOR WITH FLOW REGULATING AND PASSAGE SELECTING VALVES

BACKGROUND OF THE INVENTION

The present invention relates to a modulator for antiskid brake system for adjusting brake fluid pressure during antiskid brake control in a vehicle.

Generally, in an antiskid brake system to be installed on a vehicle, a flow regulating valve 6 is mounted upstream of a passage selector valve 5 and the passage selector valve 5 is furnished on a supply passage 4, which communicates master cylinder 1 with brake cylinder 3 of wheel. The passage selector valve 5 and flow regulating valve 6 are also furnished on the supply passage to the brake cylinder of the other wheels.

In normal brake operation, there occurs almost no pressure difference between the portion upstream of the flow regulating valve 6 and downstream of the passage selector valve 5, and the flow regulating valve 6 is maintained as shown in the FIG. 5. Under this condition, the brake fluid from the master cylinder 1 is supplied to the brake cylinder 3 through a first passage 7, and the flow of the brake fluid is not restricted by the orifice 9 of the second passage 8. Therefore, the brake fluid pressure in the brake cylinder 3 is rapidly increased when brake pedal is depressed.

When electronic controller (not shown) detects that the wheel 2 is in skid state, the passage selector valve 5 is switched on. As a result, the brake fluid in the brake cylinder 3 passes through a pressure reducing passage 10 and is discharged to a sump unit 11, and the fluid pressure in the brake cylinder 3 is decreased. For this reason, a pressure difference is generated between the supply passage 4 upstream of the flow regulating valve 6 and the supply passage 4 downstream of the passage selector valve 5. When this pressure difference exceeds the predetermined value, the first passage 7 of the flow regulating valve 6 is closed. As the result, a flow regulating valve 6 is communicated only through the second passage 8 having an orifice 9.

When it is detected that the wheel is in skid state, the electronic controller drives the pump 12. Accordingly, the pump 12 sends the brake fluid in the sump unit 11 into the volume chamber 13 to accumulate the predetermined fluid pressure in the volume chamber 13.

When the electronic controller detects under this condition that the wheel has been released from the skid state, the passage selector valve 5 is switched off, and the brake cylinder 3 and the master cylinder 1 are communicated with each other through the second passage 8. As the result, the brake fluid, which has been returned to the supply passage 4 upstream of the flow regulating valve 6, is sent to the brake cylinder 3 through the second passage 8 of the flow regulating valve 6. In this case, the flow rate of the brake fluid is restricted by the orifice 9 of the second passage 8, and the fluid pressure in the brake cylinder 3 is gradually increased.

The modulator 14 of the antiskid brake system in this embodiment comprises a passage selector valve 5, a flow regulating valve 6, a sump unit 11, a pump 12 and a volume chamber 13.

Through the control of the passage selector valve 5, flow regulating valve 6 and pump 12 in the modulator 14 by the electronic controller, the antiskid brake control for the wheel 2 is performed.

As shown in FIG. 6, the conventional type flow regulating valve 6 of the modulator 14 is provided with an opening valve 15 in the first passage 7 and an orifice unit 9 on the second passage 8. The opening valve 15 is further furnished with a plunger 15a on both ends of which the pressure upstream of the opening valve 15 and the pressure downstream of the passage selector valve 5 are applied. When the pressure difference is lower than the predetermined value, the opening valve 15 is pushed by a spring 16 and maintains the first passage 7 in open state as shown in the figure. When the pressure difference exceeds the predetermined value, the opening valve 15 closes the first passage 7. Thus, the sections upstream and downstream of the flow regulating valve 6 are communicated with each other through the second passage 8 having the orifice 9.

However, in such flow regulating valve 6, the opening valve 15 may also close the first passage 7 when in normal brake operation other than the antiskid brake control if the above pressure difference exceeds the preset value. When the first passage 7 is closed, the braking operation is slowed by the action of the orifice 9 which is a problem if a quick braking operation is needed.

For this reason, it is proposed that the opening valve 15 is operated by the difference between the discharge pressure of the pump 12 operating only during antiskid brake control and the pressure downstream of the passage selector valve 5, so that the first passage 7 is closed only during the antiskid brake control. In so doing, slow braking operation can be avoided during emergency braking. In this case, the opening valve 15 is designed in spool type.

However, in such simple arrangement, it is necessary to provide a passage to lead the pilot pressure to this spool in order to operate it. This results in a complicated arrangement of passages in the modulator. As the result, there arise many problems such as the difficulties in producing such valves, providing holes in passages, modulator, etc.

Also, to meet the requirements for such arrangement, a large size modulator is required. Moreover, difficult production and large size modulator mean higher manufacturing cost.

SUMMARY OF THE INVENTION

The object of the present invention is to provide a modulator for antiskid brake system by which it is possible to provide a simple arrangement for the brake fluid passage and to produce such a modulator in a compact size and at low cost.

To attain the above object, the modulator for an antiskid brake system according to the present invention comprises a passage selector valve furnished on a supply passage communicating the master cylinder with the brake cylinder and operated according to the skid (skidding) state of the wheel during braking and discharging brake fluid supplied to said brake cylinder to a sump unit, a pump for sending back the brake fluid pooled in said sump unit to the brake cylinder, and a flow regulating valve mounted on a supply passage upstream of the passage selector valve and provided with a first passage not restricting the flow of brake fluid to the passage selector valve and with a second passage for restricting the flow of brake fluid to the passage selector valve by an orifice, and it is characterized in that the flow regulating valve has an opening valve for opening and closing the first passage, the opening valve comprises the second passage and a housing for accommodating the orifice, and a cylindrical member concentrically engaged with the housing, the housing and the cylindrical member are set in such manner that the first passage is opened or closed by relative sliding movement thereof, and further, the flow regulating valve communicates the master cylinder with the passage selector valve through the first passage by opening the opening valve in normal case, and when the pressure difference between both ends of the movable member of the housing or the cylindrical member exceeds the preset value, the movable member is slid, the opening valve closes the first passage, and the discharge side of the pump is communicated with the passage selector valve only through the second passage.

In the modulator for antiskid brake system according to the present invention with such arrangement, the flow regulating valve is integrally mounted concentrically with the passage selector valve. Thus, these valves can be furnished in compact form. As the result, it is possible to provide the modulator in a small size. Also, it is possible to provide a simple passage arrangement in the modulator and to facilitate production thereof.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
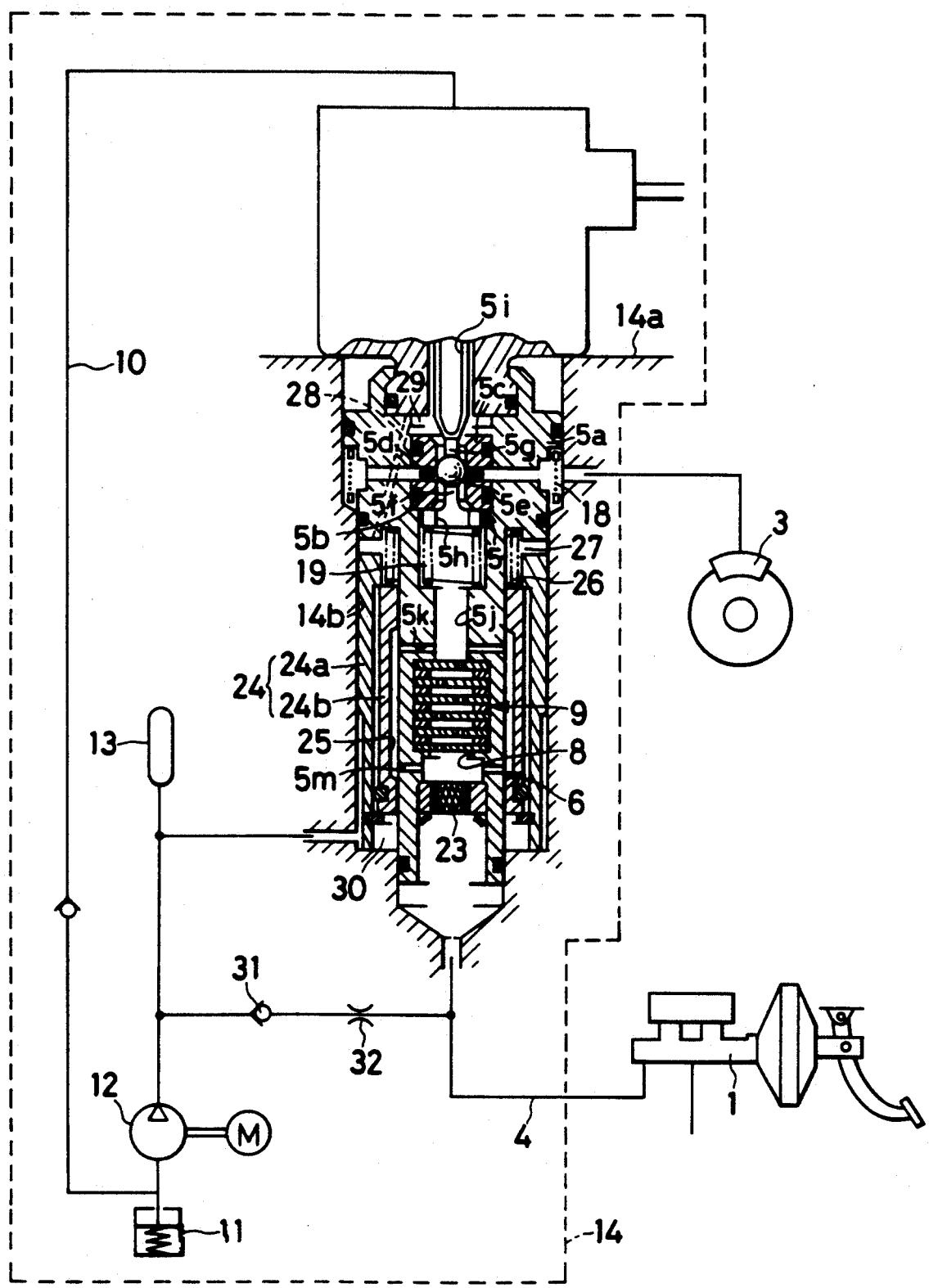
FIG. 1 is a circuit diagram of brake fluid pressure circuit of an antiskid brake system, where an embodiment of the modulator for antiskid brake system according to the present invention is incorporated.

FIG. 1 is a schematical and partial drawing of hydraulic circuit of antiskid brake system, showing an embodiment of the modulator for antiskid brake system of this invention by partial sectional view. The same component as in the above conventional example is referred by the same symbol, and detailed description is not given here. (The same applies to all embodiments hereinafter.)

As shown in FIG. 1, the passage selector valve 5 of the modulator 14 for antiskid brake system of this embodiment is almost the same as the conventional type passage selector valve. The outline of the arrangement is as follows: In a stationary housing 5a, a pair of valve seat members 5b and 5c are furnished with a spacer 5d between them, and a ball valve 5e is provided in the central hole of the spacer 5d between these valve seat members 5b and 5c. The space between the valve seat members 5b and 5c is connected to the brake cylinder 3 through a mesh filter 18. The central hole of the lower valve seat member 5b is connected to the master cylinder 1 through central passage hole 5j on the stationary housing 5a, and the central hole of the upper valve seat member 5c is connected to sump unit 11 through a pressure reducing passage 10. The ball valve 5e is operated by a valve operator 5f engaged in the central hole of the valve seat member 5b and by a valve operator 5g engaged in the central hole of the valve seat member 5c.

In the normal braking operation, the valve operator 5f is pushed upward by a spring 19, and the ball valve 5e is separated from the valve seat member 5b and seated on the valve seat member 5c. Therefore, the brake cylinder 3 is communicated with the master cylinder 1 through an adequate number of circular grooves 5h formed in axial direction on outer periphery of the valve operator 5f and central passage holes 5j and is shut off from the sump unit 11. When a solenoid (not shown) is excited during antiskid control, the valve operator 5g moves downward. As the result, ball valve 5e is separated from the valve seat member 5c and is seated on the valve seat member 5b. Accordingly, the brake cylinder 3 is cut off from the master cylinder 1 and is communicated with the sump unit 11 through an adequate number of circular grooves 5i formed in axial direction on outer periphery of the valve operator 5g, and pressure reducing passage 10.

The lower half of the stationary housing 5a of the passage selector valve 5 is formed in smaller diameter, and a flow regulating valve 6 is furnished on this small diameter portion. Specifically, an orifice 9 of the flow regulating valve 6 and a filter 23 are provided with adequate spacings in the central bore of the small diameter portion. The orifice 9 is designed as a multilayer orifice, where an adequate number (6 plates in the figure) of plates having orifices at different positions are overlapped. In the small diameter portion of the stationary housing 5a, a cylindrical member 24 is slidably engaged, and this cylindrical member 24 comprises an outer sleeve 24a slidably engaged in the hole 14b on the modulator main unit 14a and an inner sleeve 24b fixed on said outer sleeve 24a and slidably engaged with the small diameter portion of the stationary housing 5a.

A passage groove 25 of a certain length is formed between inner periphery of the inner sleeve 24b and outer periphery of small diameter portion of the housing 5a. Further, on the small diameter portion, there are provided a passage bore 5k in radial direction communicating upper portion of the passage groove 25 with the central passage bore 5j downstream of the orifice 9, and a passage bore 5m in radial direction communicating lower portion of the passage groove 25 with the central passage bore 5j upstream of the orifice 9. The cylindrical member 24 is always pushed downward by a spring 26, and the lower end of the outer sleeve 24a touches the bottom of the passage bore 14b.

The chamber 27 between the cylindrical member 24 and large diameter portion of the stationary housing 5a is communicated with the chamber 29, which is communicated to the sump unit 11 downstream of the passage selector valve 5 through the passage bore 28 on the stationary housing 5a. The chamber 30 between the lower end of the cylindrical member 24 and the bottom of the passage bore 14b is connected to the discharge side of the pump 12, and a volume chamber 13 is furnished on the connecting passage.

In normal case, the cylindrical member 24 is positioned as shown in FIG. 1, and the passage bores 5m and 5k are communicated with the passage groove 25. Therefore, the portions upstream and downstream of the orifice 9 are directly communicated with each other, bypassing the orifice 9, and the brake fluid from the master cylinder 1 mostly bypasses the orifice 9 and flows without being restricted. In other words, the passage bores 5m and 5k and the passage groove 25 form the first passage 7. When the pump 12 is driven during antiskid brake control, the brake fluid discharged from the pump 12 is sent into the chamber 30. As the result, pressure difference is generated between the lower end and the upper end of the cylindrical member 24. When this pressure difference increases to such value as to overcome the pushing force of the spring 26, the cylindrical member 24 moves upward. By this upward movement of the cylindrical member 24, the passage groove 25 is cut off from the passage bore 5m. As the result, the brake fluid from the master cylinder 1 flows only through the second passage having the orifice 9.

In this way, the cylindrical member 24 forms a spool valve, which selects to pass the brake fluid only through the second passage 8 or to pass it also through the first passage 7. Further, the cylindrical member 24 and the orifice 9 are integrally formed as a valve assembly.

Further, the supply passage 4 from the master cylinder 1 is also connected to the discharge side of the pump 12, and the connecting passage is provided with a check valve 31 allowing only the flow of brake fluid from the discharge side of the pump 12 to the supply passage 4 and an orifice 32 for preventing kickback due to pulsation of the pump 12.

In the flow regulating valve 6 of the present embodiment with the above arrangement, the cylindrical member 24 and the orifice 9 are integrally formed as a valve assembly, and it is possible to provide the modulator 14 in a more compact form. Because this valve assembly is installed coaxially with the passage selector valve 5, it is possible to make the passage arrangement more simple and to easily produce the valves, passage bores, etc. This contributes to the reduction of the cost to manufacture the modulator 14.

In the embodiment shown in FIG. 1, the lower part of stationary housing 5a includes the housing for the flow regulating valve 6 and the cylindrical member 24 moves relative thereto. In the embodiments shown in FIGS. 2–4, housing 5a includes the cylindrical member and the movable housing 20a moves relative thereto, as described below.

Figure 2:
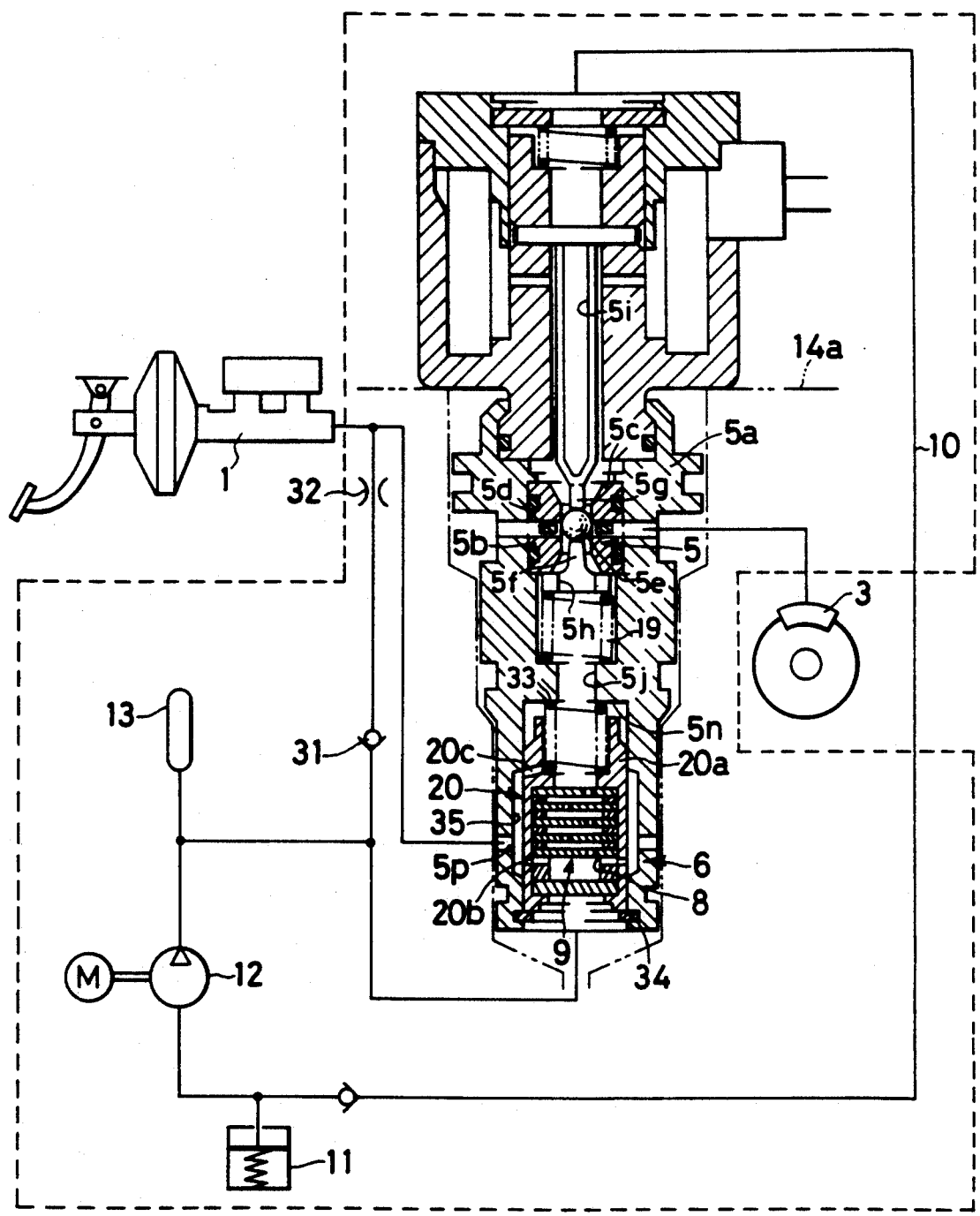
FIG. 2 is a diagram of brake fluid pressure circuit similar to FIG. 1, showing another embodiment of the invention.

FIG. 2 is a drawing similar to FIG. 1, showing another embodiment of this invention.

In this embodiment, the flow regulating valve 6 is arranged as follows: The lower portion of the central passage bore 5j on the stationary housing 5a of the passage selector valve 5 has larger diameter and a graded step 5n, and the valve assembly 20 is provided at face-to-face position to this graded step 5n. This valve assembly 20 is always pushed downward by a spring 33, and the valve assembly 20 is in touch with the fall-stop ring 34 in normal case.

The second passage 8 is formed inside the movable housing 20a of the valve assembly 20, and the orifice 9 is furnished in this second passage 8. A passage groove 35 of a certain length is formed between inner periphery of the stationary housing 5a and outer periphery of the movable housing 20a, and this passage groove 35 is connected to the master cylinder 1 through the passage bore 5p on the stationary housing 5a. On the movable housing 20a, there are provided a passage bore 20b communicating the passage groove 35 with the portion upstream of the orifice 9 and a passage bore 20c communicating the portion downstream of the orifice 9 with the passage groove 35.

Therefore, in normal case where valve assembly 20 is in touch with the fall-stop ring 34 shown in the figure, the master cylinder 1 and the portion downstream of the orifice 9 are communicated with each other, and the brake fluid from the master cylinder 1 flows by bypassing the orifice 9. In other words, a first passage 7 is made up from the passage groove 35 and the passage bore 20c.

During antiskid brake control, the pump 12 is operated and the pressure applied on the brake cylinder 3 is reduced. The brake fluid discharged from the pump 12 is introduced to the lower end of valve assembly 20. As the result, a pressure difference is generated between the lower end and upper end of the valve assembly 20. when this pressure difference increases to such a value to overcome the force of spring 33, the movable housing 20a moves upward, and the passage groove 35 is cut off from the passage bore 20c. Consequently, the first passage 7 is closed, and the pump 12 and the passage selector valve 5 are communicated with each other only by the second passage 8 having an orifice. As the result, the brake fluid from the pump 12 flows toward the brake cylinder 3 only through the orifice 9. In this way, the flow regulating valve 6 is formed by stationary housing 5a, movable housing 20a and orifice 9. When the passage groove 35 is cut off from the passage bore 20c, the master cylinder 1 is also communicated with the passage selector valve 5 through the passage bore 20b and the orifice 9.

Figure 3:
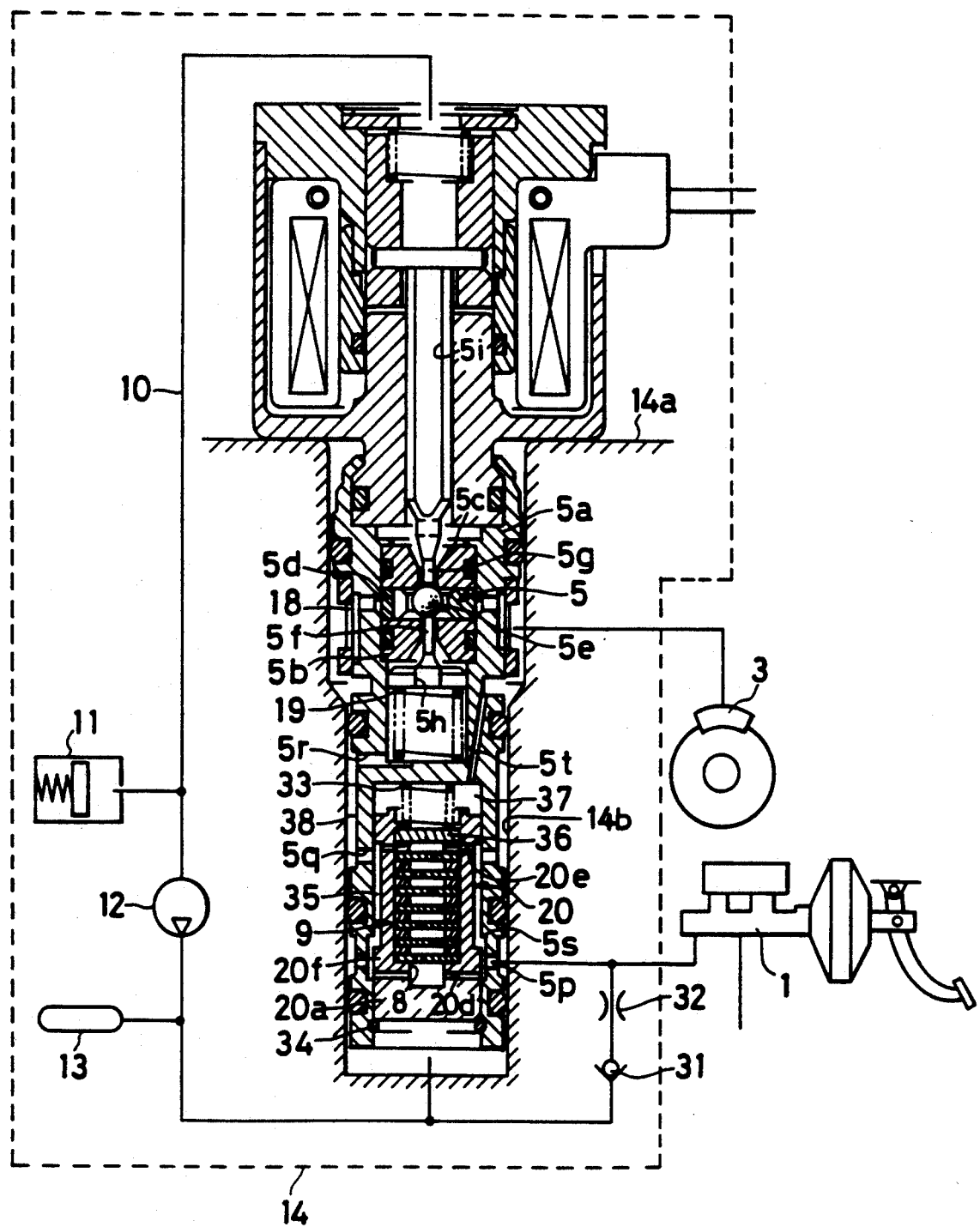
FIG. 3 is a brake fluid pressure circuit diagram similar to FIG. 1, showing still another embodiment of the invention.

FIG. 3 is a cross-sectional view showing still another embodiment of this invention.

As shown in FIG. 3, the upper end of the orifice 9 accommodated in the valve assembly 20 is blocked by the plate 36, and the valve assembly 20 is always pushed downward by the pushing force of the spring 33 through the plate 36. The chamber 37, to which the upper end of the valve assembly 20 is facing, is connected to the brake cylinder 3 through the passage bore 5t on the stationary housing 5a. Also, the lower end of the valve assembly 20 faces to the pump 12. Accordingly, the discharge pressure of the pump 12 is applied on the lower end of the valve assembly 20, and the pressure of the brake cylinder 3 is applied on the upper end of the valve assembly.

Further, a passage groove 35 is formed between inner periphery of the stationary housing 5a of the passage selector valve 5 and outer periphery of the valve assembly 20, and a passage groove 38 is formed between the outer periphery of the stationary housing 5a and the inner periphery 14b of passage bore on the main unit 14a of the modulator 14. Further, on the stationary housing 5a, there are provided a passage bore 5q communicating the passage groove 35 with the passage groove 38 and a passage bore 5r communicating the passage bore 38 and the passage selector valve 5. The master cylinder 1 is communicated with the passage selector valve 5 through the passage bore 5p, passage groove 35, passage bore 5q, passage groove 38 and passage bore 5r bypassing the orifice 9. The first passage 7 is formed by these passage bores and passage grooves.

On the movable housing 20a of the valve assembly 20, there are provided a passage bore 20d communicating the passage bore 5p and the portion upstream of the orifice 9 and a passage bore 20e communicating the passage groove 35 with the portion downstream of the orifice 9. Consequently, the master cylinder 1 is also communicated with the passage selector valve 5 through passage bore 5p, passage bore 20d, orifice 9, passage bore 20e, passage groove 35, passage bore 5q, passage groove 38 and passage bore 5r, and the second passage 8 is formed by these passage bores and passage grooves. Further, a land 5s is furnished on inner periphery of the stationary housing 5a, and a land 20f is formed on outer periphery of the movable housing 20a.

In normal case where the valve assembly 20 is pushed by its spring 33 and is at its lowermost position as shown in FIG. 3, both lands 5s and 20f are separated from each other, and the passage bore 5p is directly communicated with the passage groove 35. Therefore, the brake fluid from master cylinder 1 flows to the passage selector valve 5 without being restricted through the first passage 7 formed mainly by the passage bore 5p and the passage groove 35. During antiskid brake control, the pump 12 is driven, and discharge pressure of the pump 12 is applied on lower end of the movable housing 20a when pressure is applied on the brake cylinder 3 after the pressure has been reduced as described above. Accordingly, pressure difference is generated between upper and lower ends of the movable housing 20a, and the movable housing 20a moves upward. As the result, the lands 5s and 20f work together and cut off the direct communication between the passage bore 5p and the passage groove 35. Therefore, the fluid flows to the passage selector valve 5 only through the second passage 8 provided with an orifice 9. Thus, the flow regulating valve 6 is formed by orifice 9, passage groove 35, passage bores 20d and 20e, and lands 5s and 20f.

Figure 4:
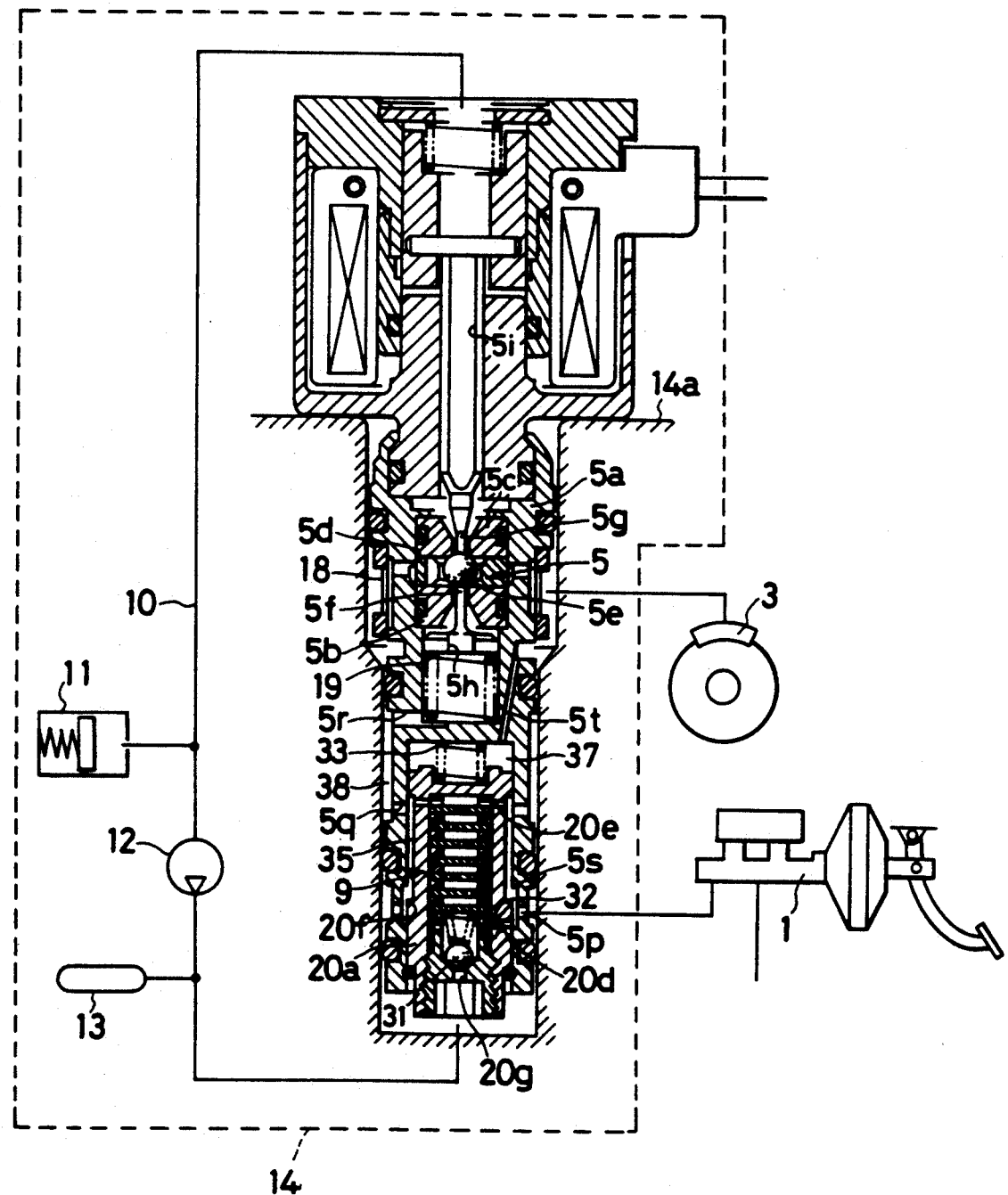
FIG. 4 is a brake fluid pressure circuit diagram similar to FIG. 1, showing yet still another embodiment of this invention.
Figure 5:
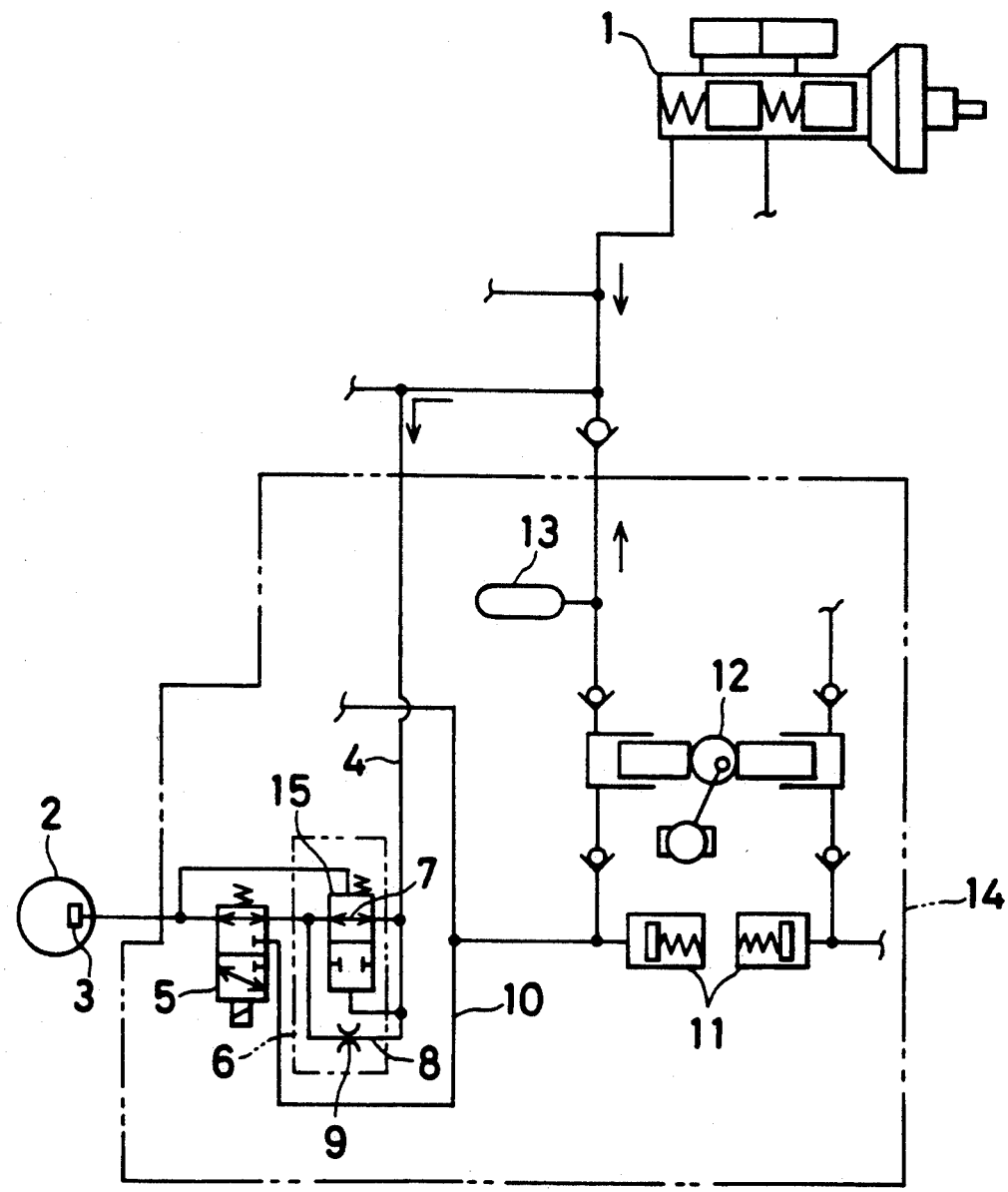
FIG. 5 shows an example of a conventional type antiskid control circuit.
Figure 6:
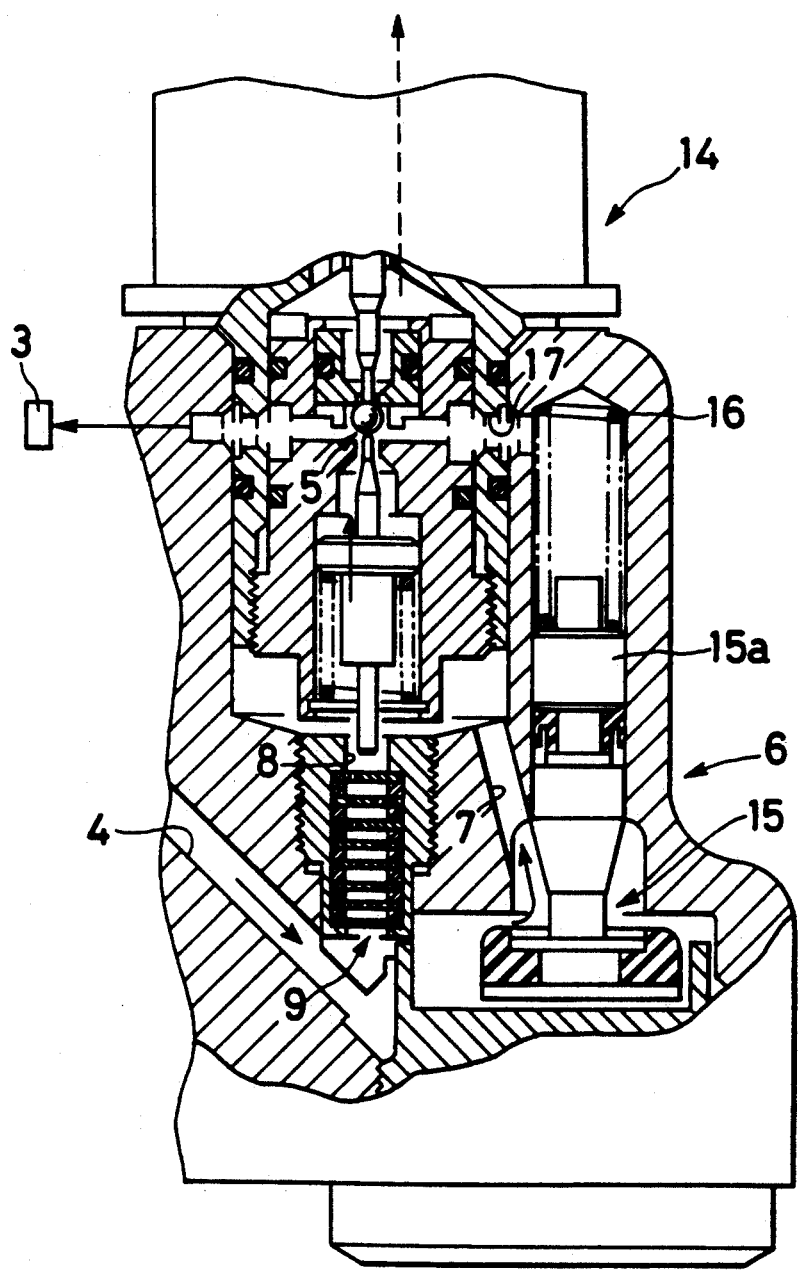
FIG. 6 is a partial cross-sectional view of a conventional type modulator.

FIG. 4 shows yet still another embodiment of the present invention.

In the embodiment of FIG. 3, the orifice 32 and the check valve 31 for preventing kickback to the master cylinder 1 due to pulsation of the pump 12 are separately furnished outside the stationary housing 5a. In contrast, the orifice 32 in the present embodiment is furnished in the passage bore 20d of the movable housing 20a in valve assembly 20 as shown in FIG. 4. Also, on the movable housing 20a, a passage bore 20g directly communicating the portion upstream of the orifice 9 and the pump 12 is provided, and a check valve 31 is mounted to this passage bore 20g. That is, the orifice 32 and the check valve 31 are integrally furnished on the movable housing 20a.

The other arrangement is the same as in the embodiment of FIG. 3.

As evident from the above description, it is possible by the modulator for antiskid brake system to provide a modulator in small size because passage selector valve and flow regulating valve can be designed in compact form.

Because flow regulating valve and passage selector valve are concentrically furnished, simple valve structure and easy passage arrangement can be attained. Accordingly, this contributes to easy and simple working of valves, passages and other parts.

Further, because modulator is furnished in compact design and working is achieved in simple manner, the manufacturing cost of the modulator can be reduced.

Further, the flow regulating valve closes the first passage by discharge pressure of the pump, which is driven only during antiskid control. This contributes to the prevention of operation delay due to the closing of the first passage during normal braking operation, and the opening of the first passage during antiskid control can be avoided.

What we claim is:

1. A modulator for an antiskid brake system, which comprises a passage selector valve furnished on a supply passage communicating a master cylinder with a brake cylinder and operated according to a skid state of a wheel during braking and discharging brake fluid supplied to said brake cylinder to a sump unit, a pump for sending back brake fluid pooled in said sump unit to said brake cylinder, and a flow regulating valve mounted on a supply passage upstream of said passage selector valve and provided with a first passage which when open has no flow restriction of brake fluid to said passage selector valve and with a second passage restricting flow of brake fluid to said passage selector valve by an orifice.

said flow regulating valve having an opening valve means for opening and closing said first passage, said opening valve means including said second passage, a housing for accommodating said orifice, and a cylindrical member concentrically engaged with said housing, and said housing and said cylindrical member being arranged to slide relative to each other for said opening and closing of said first passage, one of said housing and said cylindrical member comprising a movable member, one end of said movable member receiving discharge pressure from said pump and another end of said movable member receiving pressure from said brake cylinder;

said flow regulating valve being arranged to communicate said master cylinder with said passage selector valve through said first passage opened by said opening valve means in normal case; and when a pressure difference between said discharge pressure of said pump and said brake cylinder pressure exceeds a preset value, said movable member is slid, said opening valve means closes said first passage, and a discharge side of said pump is communicated with said passage selector valve only through said second passage; and said passage selector valve includes a valve means and a driving means respectively arranged concentrically on one of said housing and cylindrical member of said opening valve means, said valve means for switching between first and second positions, said first position communicating said master cylinder and said brake cylinder and interrupting communication between said brake cylinder and said sump unit, and said second position interrupting communication between said master cylinder and said brake cylinder and communicating said brake cylinder with said sump unit, said driving means for setting said valve means to one of said first and second positions.

2. A modulator for an antiskid brake system according to claim 1, wherein said movable member is said housing, said pump discharge pressure is applied on one end of said housing, said pressure from said brake cylinder is applied on another end of said housing, and said opening valve closes said first passage when the pressure difference between said pump discharge pressure and said brake cylinder pressure exceeds the preset value.

3. A modulator for an antiskid brake system according to claim 1, wherein said housing is integrally provided with a check valve, which is installed on a passage between said pump and said orifice and allows only the flow of brake fluid running from said pump, and with a second orifice furnished on a passage communicating a section downstream of said check valve with said master cylinder.

4. A modulator for an antiskid brake system according to claim 1, wherein said housing is said movable member and said housing is concentrically and slidably engaged on an inner periphery of said cylindrical member.

5. A modulator for an antiskid brake system according to claim 4, wherein said first passage is formed by a passage groove between an inner periphery of said cylindrical member and an outer periphery of said housing, and said second passage is formed in said housing.

6. A modulator for an antiskid brake system according to claim 5, wherein said opening valve means is formed by an inner peripheral land provided on an inner periphery of said cylindrical member and by an outer peripheral land provided on an outer periphery of said housing, and said opening valve means closes said first passage when said inner peripheral land overlaps with said outer peripheral land in a radial direction, and said opening valve means opens said first passage when said inner peripheral land does not overlap with said outer peripheral land in said radial direction.

7. A modulator for an antiskid brake system, which comprises a passage selector valve furnished on a supply passage communicating a master cylinder with a brake cylinder and operated according to a skid state of a wheel during braking and discharging brake fluid supplied to said brake cylinder to a sump unit, a pump for sending back brake fluid pooled in said sump unit to said brake cylinder, and a flow regulating valve mounted on a supply passage upstream of said passage selector valve and provided with a first passage which when open has no flow restriction of brake fluid to said passage selector valve and with a second passage restricting flow of brake fluid to said passage selector valve by an orifice, said flow regulating valve having an opening valve means for opening and closing said first passage; said opening valve means including a housing having said second passage containing said orifice, and a cylindrical member concentrically arranged with said housing; said housing and said cylindrical member being arranged to slide relative to each other for said opening and closing said first passage by movement of said cylindrical member relative to said housing, one end of said cylindrical member receiving discharge pressure of said pump and another end of said cylindrical member receiving pressure from a third passage communicating said passage selector valve and said sump unit;

said flow regulating valve being arranged to communicate said master cylinder with said passage selector valve through said first passage opened by said opening valve means in normal case; and when a pressure difference between said pump discharge pressure and pressure of said third passage exceeds a preset value said cylindrical member is slid, said opening value means closes said first passage, and a discharge side of said pump is communicated with said passage selector valve only through said second passage; and said passage selector valve includes a valve means and a driving means respectively arranged concentrically on said cylindrical member of said opening valve means, said valve means for switching between first and second positions, said first position communicating said master cylinder and said brake cylinder and interrupting communication between said brake cylinder and said sump unit, and said second position interrupting communication between said master cylinder and said brake cylinder and communicating said brake cylinder with said sump unit, said driving means for setting said valve means to one of said first and second positions.

8. A modulator for an antiskid brake system, which comprises a passage selector valve furnished on a supply passage communicating a master cylinder with a brake cylinder and operated according to a skid state of a wheel during braking and discharging brake fluid supplied to said brake cylinder to a sump unit, a pump for sending back brake fluid pooled in said sump unit to said brake cylinder, and a flow regulating valve mounted on a supply passage upstream of said passage selector valve and provided with a first passage which when open has no flow restriction of brake fluid to said passage selector valve and with a second passage restricting flow of brake fluid to said passage selector valve by an orifice, said flow regulating valve having an opening valve means for opening and closing said first passage; said opening valve means including a housing having said second passage containing said orifice, and a cylindrical member concentrically arranged with said housing; said housing and said cylindrical member being arranged to slide relative to each other for opening and closing said first passage by movement of said housing relative to said cylindrical member, one end of said housing receiving discharge pressure of said pump and another end of said housing receiving pressure upstream of said passage selector valve, said flow regulating valve being arranged to communicate said master cylinder with said passage selector valve through said first passage in a normal case; and when pressure difference between said pump discharge pressure and said upstream pressure exceeds a preset value, said opening valve means closes said first passage, and a discharge side of said pump is communicated with said passage selector valve only through said second passage, said passage selector valve including a valve means and a driving means respectively arranged concentrically on said cylindrical member of said opening valve means, said valve means for switching between first and second positions, said first position communicating said master cylinder and said brake cylinder and interrupting communication between said brake cylinder and said sump unit, and said second position interrupting communication between said master cylinder and said brake cylinder and communicating said brake cylinder with said sump unit, and said driving means for setting said valve means to one of said first and second positions.

* * * * *